United States Patent
Nagaoka

(10) Patent No.: US 9,530,216 B2
(45) Date of Patent: Dec. 27, 2016

(54) IMAGE PROCESSING APPARATUS AND IMAGE PROCESSING METHOD

(71) Applicant: Panasonic Intellectual Property Management Co., Ltd., Osaka-shi (JP)

(72) Inventor: Eiichi Nagaoka, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 304 days.

(21) Appl. No.: 14/225,426

(22) Filed: Mar. 26, 2014

(65) Prior Publication Data
US 2014/0294308 A1    Oct. 2, 2014

(30) Foreign Application Priority Data

Mar. 27, 2013 (JP) .................. 2013-065901
Mar. 13, 2014 (JP) .................. 2014-050324

(51) Int. Cl.
*G06K 9/34*     (2006.01)
*G06T 7/00*     (2006.01)
(Continued)

(52) U.S. Cl.
CPC ........... *G06T 7/0081* (2013.01); *G06K 9/3233* (2013.01); *G06T 7/408* (2013.01);
(Continued)

(58) Field of Classification Search
CPC .............. G06T 7/0081; G06T 7/408; G06T 2207/20104; G06T 2207/144; G06K 2009/613; G06K 9/3233
(Continued)

(56) References Cited

U.S. PATENT DOCUMENTS 5,887,080 A    3/1999    Tsubusaki et al.
6,289,123 B1    9/2001    Xiaomang et al.
(Continued)

FOREIGN PATENT DOCUMENTS

JP    H05-216992 A    8/1993
JP    H07-078263 A    3/1995
(Continued)

OTHER PUBLICATIONS

Office Action from the co-pending U.S. Appl. No. 14/243,913 issued on May 21, 2015.
(Continued)

*Primary Examiner* — Kanjibhai Patel
(74) *Attorney, Agent, or Firm* — Shinjyu Global IP

(57) ABSTRACT

The image processing apparatus performs region designation with respect to a displayed image. The image processing apparatus comprises a display unit configured to display an image constituted by a predetermined number of pixels, an input unit configured to receive a selection operation with respect to the image, a control unit, and a storage unit. The control unit generates a plurality of divided regions acquired by dividing the image in accordance with similarity calculated based on pixel values and pixel locations. Each time a divided region among the plurality of divided regions is selected according to the selection operation received by the input unit, the control unit stores identification information of the selected divided region in the storage unit in association with a selection order of selecting the divided region. The control unit displays the divided region corresponding to the stored identification information on the display unit in an identifiable manner.

9 Claims, 16 Drawing Sheets

(51) Int. Cl.
 *G06K 9/32* (2006.01)
 *G06T 7/40* (2006.01)
(52) U.S. Cl.
 CPC ............ *G06T 2207/10024* (2013.01); *G06T 2207/20104* (2013.01); *G06T 2207/20144* (2013.01)
(58) Field of Classification Search
 USPC ........................................ 382/171, 173, 199
 See application file for complete search history.

(56) References Cited

U.S. PATENT DOCUMENTS

| | | | |
|---|---|---|---|
| 6,583,823 B1 | 6/2003 | Shimada et al. | |
| 7,411,612 B2 | 8/2008 | Yamada et al. | |
| 7,620,202 B2* | 11/2009 | Fujimura | G06K 9/00201 348/169 |
| 7,848,567 B2* | 12/2010 | Chiu | G06K 9/3233 358/2.1 |
| 7,961,951 B2 | 6/2011 | Tsutsumi | |
| 8,009,909 B2* | 8/2011 | Hirai | H04N 1/32122 382/100 |
| 8,023,014 B2 | 9/2011 | Kim et al. | |
| 8,027,535 B2 | 9/2011 | Sanami | |
| 8,131,083 B2* | 3/2012 | Yoshino | G06F 17/30247 345/156 |
| 8,208,752 B2 | 6/2012 | Ishii | |
| 8,229,674 B2 | 7/2012 | Guittet et al. | |
| 8,306,324 B2 | 11/2012 | Sanami | |
| 8,472,076 B2 | 6/2013 | Ikeda | |
| 8,744,175 B2* | 6/2014 | Masuko | H04N 1/3873 358/518 |
| 9,171,108 B2* | 10/2015 | Chen | G06F 17/5004 |
| 2002/0015526 A1 | 2/2002 | Nomura et al. | |
| 2004/0208395 A1 | 10/2004 | Nomura | |
| 2005/0057657 A1 | 3/2005 | Yamada et al. | |
| 2005/0089241 A1 | 4/2005 | Kawanishi et al. | |
| 2005/0129326 A1 | 6/2005 | Matama | |
| 2006/0082595 A1 | 4/2006 | Liu et al. | |
| 2006/0256383 A1 | 11/2006 | Yamakawa | |
| 2007/0035790 A1 | 2/2007 | Kotani | |
| 2007/0201744 A1 | 8/2007 | Sanami | |
| 2007/0217686 A1* | 9/2007 | Yamamoto | H04N 5/23212 382/218 |
| 2008/0101655 A1* | 5/2008 | Noh | G06K 9/3241 382/103 |
| 2008/0158386 A1 | 7/2008 | Miki | |
| 2008/0240608 A1 | 10/2008 | Ishii | |
| 2009/0067015 A1* | 3/2009 | Sasaki | H04N 1/46 358/505 |
| 2009/0153923 A1 | 6/2009 | Lin | |
| 2009/0245678 A1 | 10/2009 | Ming | |
| 2010/0066761 A1 | 3/2010 | Tousch et al. | |
| 2011/0032581 A1 | 2/2011 | Ikeda | |
| 2011/0304637 A1 | 12/2011 | Sanami | |
| 2012/0230591 A1 | 9/2012 | Shibata | |
| 2013/0016246 A1 | 1/2013 | Hatanaka et al. | |
| 2013/0051679 A1 | 2/2013 | Tsuda et al. | |
| 2013/0081982 A1 | 4/2013 | Tanaka | |
| 2013/0287259 A1 | 10/2013 | Ishii | |
| 2013/0293469 A1 | 11/2013 | Hakoda et al. | |
| 2014/0355831 A1 | 12/2014 | Han et al. | |

FOREIGN PATENT DOCUMENTS

| | | |
|---|---|---|
| JP | H07-282219 A | 10/1995 |
| JP | H09-016368 A | 1/1997 |
| JP | H09-270022 A | 10/1997 |
| JP | H11-039480 A | 2/1999 |
| JP | H11-103447 A | 4/1999 |
| JP | 2003-108980 A | 4/2003 |
| JP | 2003-123066 A | 4/2003 |
| JP | 2004-318696 A | 11/2004 |
| JP | 2005-092284 A | 4/2005 |
| JP | 3824237 B2 | 9/2006 |
| JP | 2006-279442 A | 10/2006 |
| JP | 2006-279443 A | 10/2006 |
| JP | 2006-311080 A | 11/2006 |
| JP | 2007-060325 A | 3/2007 |
| JP | 2007-110329 A | 4/2007 |
| JP | 2007-128238 A | 5/2007 |
| JP | 2007-226671 A | 9/2007 |
| JP | 2008-092447 A | 4/2008 |
| JP | 2008-164758 A | 7/2008 |
| JP | 2008-244867 A | 10/2008 |
| JP | 2008-299516 A | 12/2008 |
| JP | 2008-299591 A | 12/2008 |
| JP | 2008-300990 A | 12/2008 |
| JP | 2009-181528 A | 8/2009 |
| JP | 2010-511215 A | 4/2010 |
| JP | 2011-035567 A | 2/2011 |
| JP | 2011-055488 A | 3/2011 |
| JP | 4652978 B2 | 3/2011 |
| JP | 2011-170838 A | 9/2011 |
| JP | 2011-170840 A | 9/2011 |
| JP | 2011-191860 A | 9/2011 |
| JP | 2012-088796 A | 5/2012 |
| JP | 2013-045316 A | 3/2013 |
| WO | 2009/142333 A1 | 11/2009 |
| WO | 2011/061943 A1 | 5/2011 |
| WO | 2013/073168 A1 | 5/2013 |

OTHER PUBLICATIONS

Office Action from the corresponding Japanese Patent Application No. 2014-050332 issued on Mar. 10, 2015.
Office Action from the corresponding Japanese Patent Application No. 2014-050324 issued on Mar. 17, 2015.
Office Action from the corresponding Japanese Patent Application No. 2014-050326 issued on Apr. 14, 2015.
Office Action from the co-pending U.S. Appl. No. 14/225,445 issued on Mar. 4, 2016.

* cited by examiner

IMAGE PROCESSING APPARATUS AND IMAGE PROCESSING METHOD

PRIORITY

This application claims priority to Japanese Patent Applications No. 2013-065901 filed on Mar. 27, 2013 and No. 2014-50324 filed on Mar. 13, 2014. The entire disclosure of Japanese Patent Application No. 2013-065901 and No. 2014-50324 is hereby incorporated herein by reference.

BACKGROUND

Technical Field

The present disclosure relates to a technique for displaying a range designated by a user in an image processing apparatus that allows a user to designate a portion of an image and perform image processing on that portion, for example.

Background Art

There is known to be an image processing apparatus that allows a user to designate a specific region in a displayed image and perform predetermined image processing on that region (e.g., cutting out the designated region). It is common in such image processing apparatuses to designate a region in units of pixels, such as the case where the user uses a digitizer or a pointing device such as a mouse to trace the outline portion of a region to be cut out while seeing an image displayed on a display, as disclosed in Japanese Laid-open Patent Publication H5-216992A, for example.

SUMMARY

The present disclosure provides an image processing apparatus and an image processing method that enable a user to more easily carry out the task of designating a portion of an image.

An image processing apparatus according to one aspect of the present disclosure is an image processing apparatus for performing region designation with respect to a displayed image, including: a display unit configured to display an image constituted by a predetermined number of pixels; an input unit configured to receive a selection operation with respect to the image; a control unit configured to control the display unit and the input unit; and a storage unit which the control unit reads from and writes data to. The control unit is configured to generate a plurality of divided regions acquired by dividing the image in accordance with similarity calculated based on pixel values and pixel locations. Each time a divided region among the plurality of divided regions is selected according to the selection operation received by the input unit, the control unit stores identification information of the selected divided region in the storage unit in association with a selection order of selecting the divided region, and displays the divided region corresponding to the stored identification information on the display unit in an identifiable manner.

An image processing method according to another aspect of the present disclosure is an image processing method of performing region designation with respect to an image displayed by a display apparatus, including: acquiring a plurality of divided regions by dividing an image constituted by a predetermined number of pixels in accordance with similarity calculated based on pixel values and pixel locations; and each time a divided region is selected according to a selection operation performed by a user, storing identification information of the selected divided region in a memory in association with a selection order, and displaying the divided region corresponding to the stored identification information on the display apparatus in an identifiable manner.

The image processing apparatus and the image processing method of the present disclosure are advantageous to allowing a user to more easily carry out the task of designating a portion of an image.

DETAILED DESCRIPTION

Hereinafter, embodiments of the present disclosure will be described in detail with reference to the drawings as appropriate. Note that there are cases where descriptions in greater detail than necessary will not be given. For example, there are cases where detailed descriptions will not be given for well-known matter, and where redundant descriptions will not be given for configurations that are substantially the same. The purpose of this is to avoid unnecessary redundancy in the following description and to facilitate understanding by a person skilled in the art. It will be apparent to those skilled in the art from this disclosure that the following descriptions of the embodiments are provided for illustration only and not for the purpose of limiting the invention as defined by the appended claims and their equivalents.

Note that the accompanying drawings and following description are provided for sufficient understanding of the present disclosure by a person skilled in the art, and are not intended to limit the subject matter recited in the claims.

Embodiment 1

The following describes Embodiment 1 with reference to FIGS. 1 to 16.

1. Configuration

Figure 1:
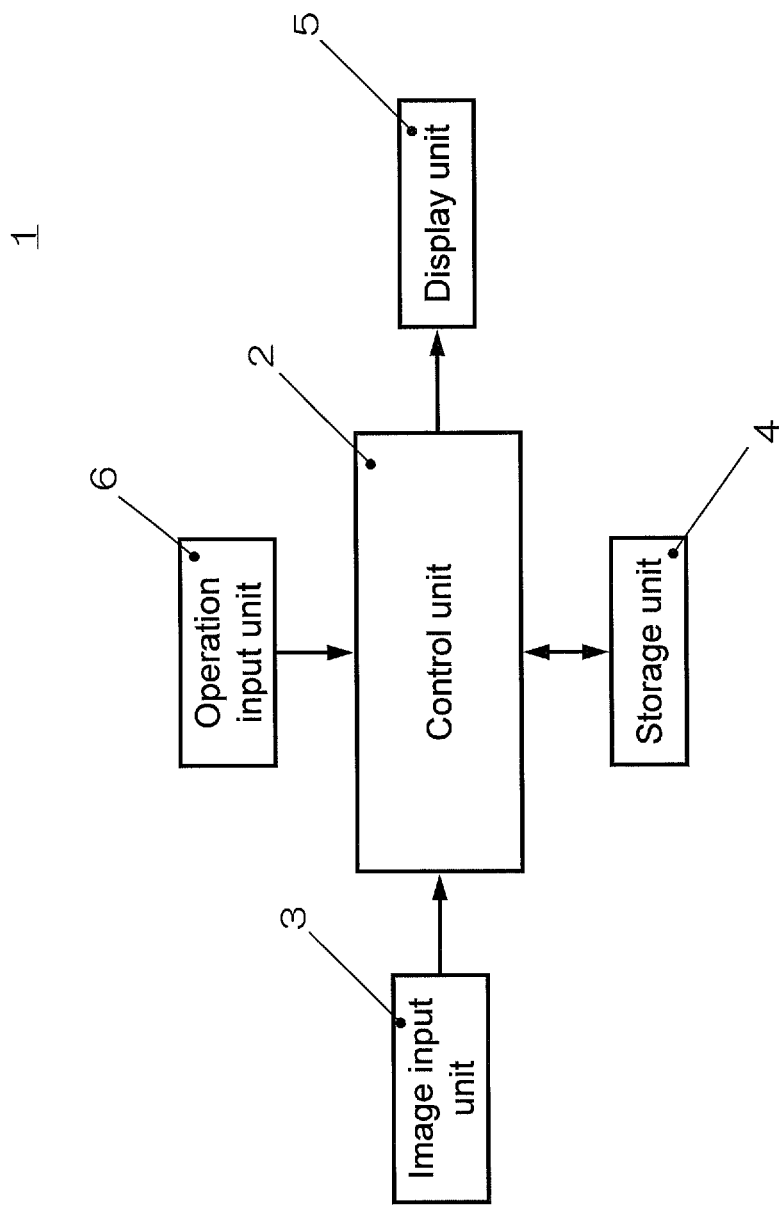
FIG. 1 is a block diagram showing a schematic configuration of an image processing apparatus 1 according to an embodiment.

FIG. 1 is a block diagram schematically showing the configuration of an image processing apparatus 1. The image processing apparatus 1 is any electronic device, such as a digital still camera, a digital video camera, a personal computer, a mobile phone, or an information terminal. The image processing apparatus 1 includes a control unit 2 (example of a control unit) that performs overall control of operations of units in the image processing apparatus 1; an image input unit 3, such as a camera or a scanner, that includes a lens and an imaging device and captures images; a storage unit 4 (example of a storage unit) that records various types of information such as captured images; a display unit 5 (example of a display unit), such as a liquid crystal monitor or an organic EL display, that displays image information such as images; and an operation input unit 6 (example of an input unit), such as a touch panel, that receives an input of various types of operations from a user. The input unit 6 detects that the user's finger or the like has touched the screen of the display unit 5, and a detection result is obtained by a determination made by the control unit.

The control unit 2 includes a processor such as a CPU, and executes operations of the image processing apparatus 1 by executing processing in a predetermined program. The storage unit 4 may be constituted by a hard disk, a silicon disk, an SD card (semiconductor memory), or the like. The storage unit 4 may be constituted by an element that performs temporary storage, such as a cache or a RAM.

Also, the operation input unit 6 may be a pointing device such as a mouse or a tablet, or may be a keyboard. Alternatively, the operation input unit 6 may be an electronic pen of any of various systems, or the like.

2. Operations

2-1. Operations of Image Processing Apparatus

Operations of the image processing apparatus 1 configured as described above will be described below with reference to the flowchart of FIG. 2. In accordance with an instruction given through a user operation, the control unit 2 of the image processing apparatus 1 causes an image captured by the image input unit 3 to be displayed on the display unit 5. In this case, a configuration is possible in which an image captured by the image input unit 3 is stored in the storage unit 4 in advance, and that image is read out from the storage unit 4 and displayed on the display unit 5 (step S101).

Next, the control unit 2 performs segment division processing for dividing the image into multiple small regions (segments) based on similarity between values of the pixels of the image (step S102).

The control unit 2 then enters a state of waiting for user input, and performs region designation processing for performing predetermined processing with respect to various types of user operations (events) (step S103).

When region designation performed by the user has been completed, the control unit 2 performs predetermined image processing on the designated region (e.g., processing for cutting out the designated region) (step S104).

Next, operations in the segment division processing (step S102) and the region designation processing (step S103) will be described in detail.

2-2. Operations in Segment Division Processing

The following describes the segment division processing, which is for dividing an image into multiple small regions (example of divided regions, which will be referred to hereinafter as "segments") based on similarity between values of the pixels of the image. In the present embodiment, a segment division method based on k-means clustering is used as the segment division processing.

Figure 3:
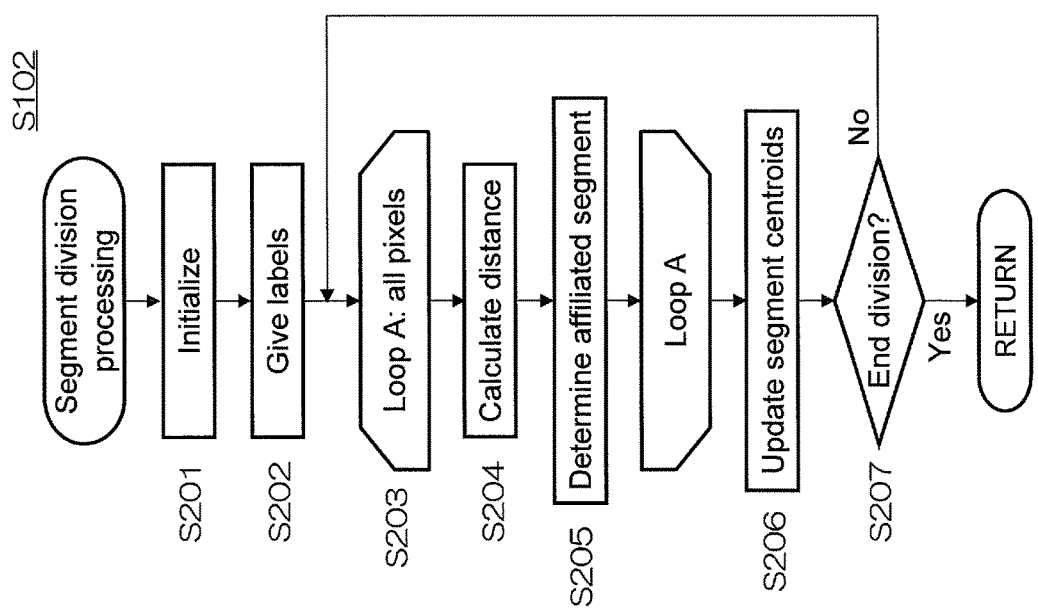
FIG. 3 is a flowchart showing operations in segment division processing performed by the image processing apparatus 1.
Figure 5:
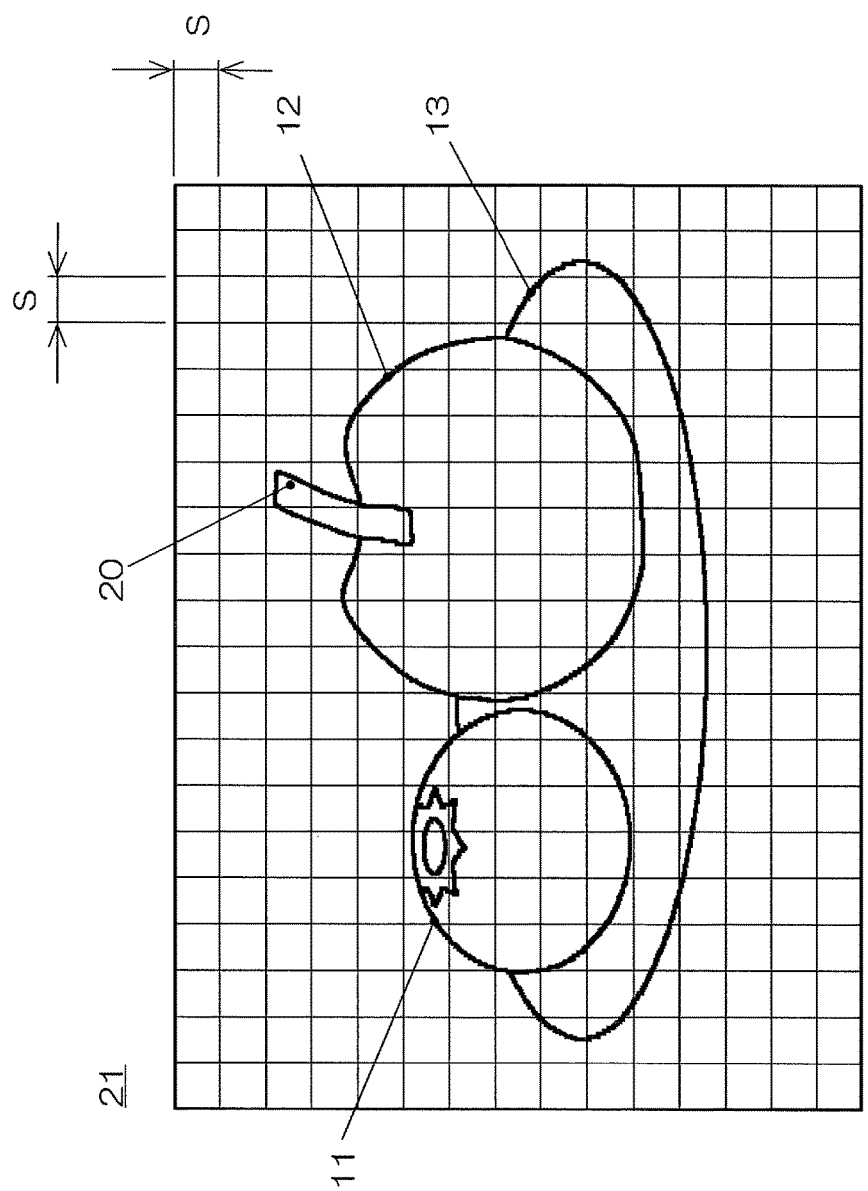
FIG. 5 is a diagram for describing an initial state in the segment division processing performed by the image processing apparatus 1.
Figure 6:
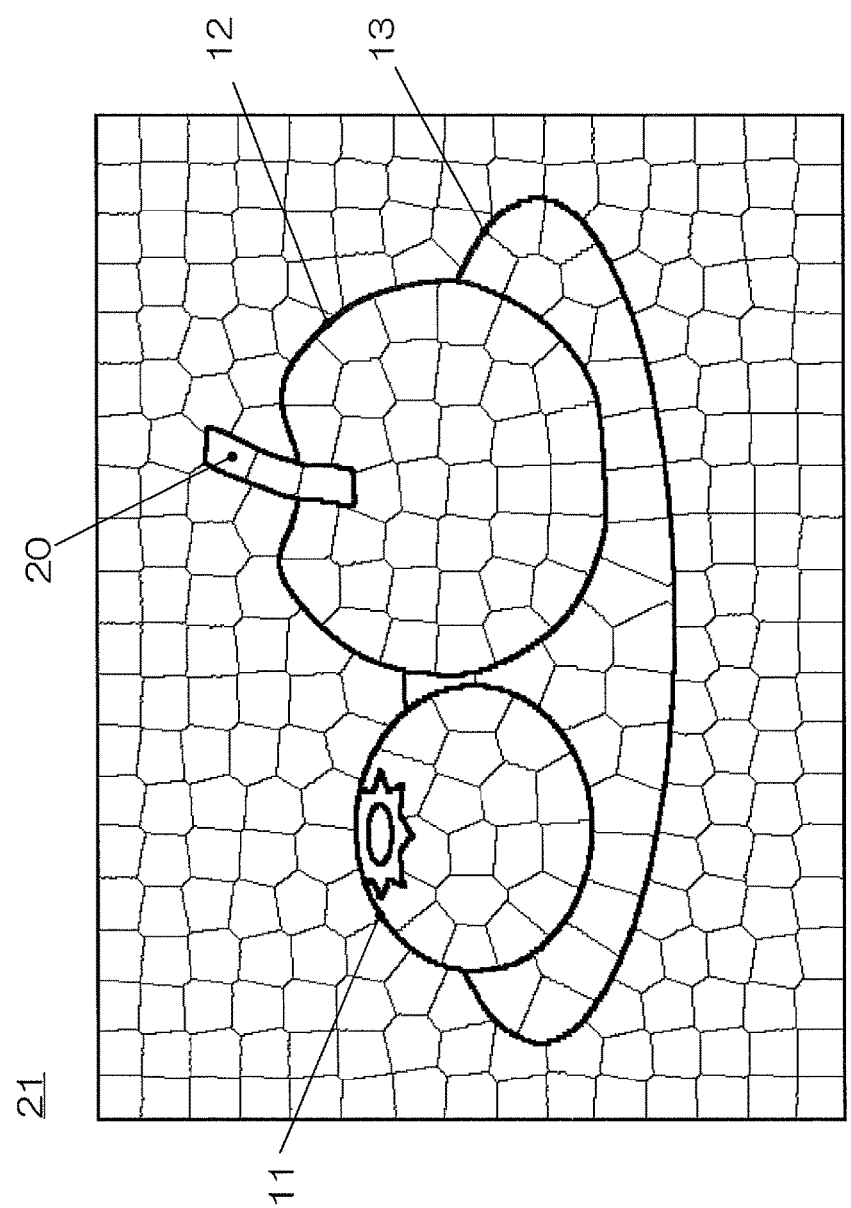
FIG. 6 is a diagram for describing a processing result of the segment division processing performed by the image processing apparatus 1.

FIG. 3 is a flowchart showing operations in the segment division processing. Also, FIG. 4 is a diagram showing the display state of an input image that is displayed on the liquid crystal monitor and is to be the target of processing, FIG. 5 is a diagram for describing the initial state in the segment division processing, and FIG. 6 is a diagram for describing processing results of the segment division processing.

Figure 4:
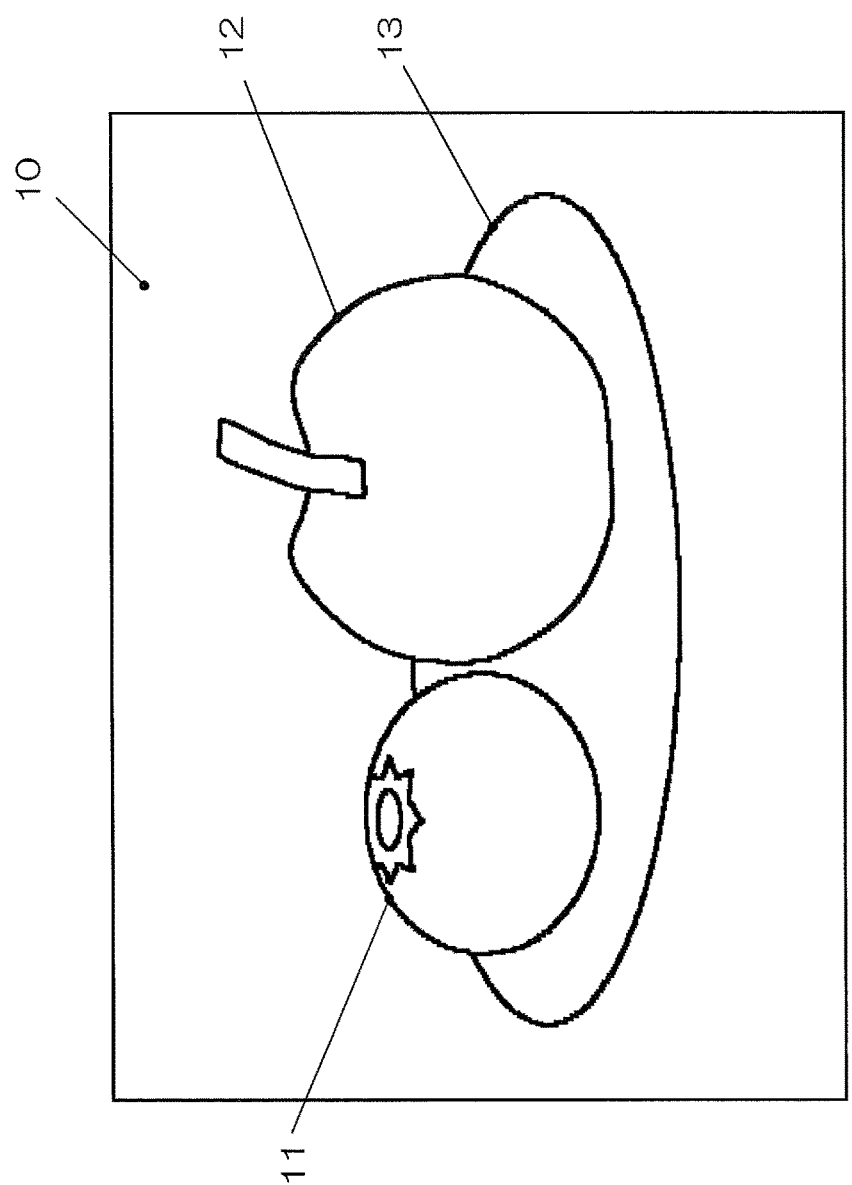
FIG. 4 is a diagram showing a display state of an input image displayed by the image processing apparatus 1.

As shown in FIG. 4, an input image 10, which was acquired by the image input unit 3 and is displayed on the display unit 5, includes a first subject 11, a second subject 12, a third subject 13, and the like. The following description will continue taking the example of the case where the user designates the first subject 11 among the three subjects.

Note that the input image 10 is digital data expressed in the YUV color space, for example, and can be subjected to digital processing by the control unit 2. Specifically, the input image 10 is constituted by M×N (e.g., 640×480) pixels, and each pixel has data indicating three values, namely a luminance Y and color differences U and V (referred to hereinafter as the "pixel value"). Note that since the image data format allows conversion between color spaces such as the RGB color space and the Lab color space, processing may be performed using the results of conversion into another color space as the pixel value.

As an initialization task, the control unit 2 divides the image 10 into k (k being an integer of two or more) initial segments (step S201). The centroids of these k initial segments are arranged evenly both vertically and horizontally in the image 10. The interval between adjacent centroids is S (pixels). FIG. 5 shows this initialized state, and in the example shown here, 20×15 initial segments 20 have been arranged evenly both vertically and horizontally.

Each segment is then given an individually unique label (example of identification information) (step S202). For example, with the top-left segment in the screen serving as the first segment, the segments in FIG. 5 are given numbers k that increase to the right and downward in a line scanning manner. The label of the segment indicated by reference numeral 20 in this figure is k=54. This label may be a random number or a character such as an alphabet letter. Note that the labels are to be unique such that segments having the same label do not exist at the same time.

Next, the control unit 2 performs the processing of loop A on all of the pixels in the image 10 (step S203). In the processing of loop A, the processing of steps S204 and S205 is performed on each pixel in the image 10.

For each pixel, the control unit 2 calculates a distance Ds with respect to the centroid of each of the segments (step S204). This distance Ds is a value indicating similarity defined using the pixel value and the pixel location. Here, the smaller the distance Ds is, the higher the similarity of the pixel to the centroid of the segment is determined to be.

For example, in the case of the i-th pixel that is at the pixel location (xi,yi) and has the pixel value (Yi,Ui,Vi), the distance Ds to the k-th segment is calculated using Equation 1 below.

$$Ds = D1 + \frac{m^2}{S^2}D2 \qquad \text{Equation 1}$$
$$D1 = (Yi - Yk)^2 + (Ui - Uk)^2 + (Vi - Vk)^2$$
$$D2 = (xi - xk)^2 + (yi - yk)^2$$

Here, the centroid of the segment is at the pixel location (xk,yk) and has the pixel value (Yk,Uk,Vk). The initial values of this segment centroid may be the location of the corresponding segment centroid after the segments are evenly arranged as shown in FIG. 5, and the pixel value at that location.

Also, m is a coefficient for obtaining balance between the influence that a distance D1 based on the pixel value exerts on the distance Ds and the influence that a distance D2 based on the pixel location exerts on the distance Ds. This coefficient m may be determined in advance experimentally or empirically.

Next, the control unit 2 determines the segment that the target pixel i is to belong to using the distances Ds (step S205). Specifically, the segment that has the centroid corresponding to the lowest distance Ds is determined to be the affiliated segment for the target pixel i.

This processing in steps S204 and S205 is carried out on all of the pixels included in the image 10 (step S203), thus determining an affiliated segment for each of the pixels. Specifically, M×N data pieces given the labels of the segments to which the pixels belong are obtained. These data pieces will collectively be referred to hereinafter as a label image 21.

Next, the control unit 2 updates the centroid of each segment in which a belonging pixel was changed in the processing of loop A (step S206). Updating the centroids of the segments makes it possible to perform more accurate division processing. The control unit 2 then calculates the pixel location (xk,yk) and the pixel value (Yk,Uk,Vk) of the new centroid using Equation 2 below.

$$Yk = \frac{1}{N}\sum_{i=0, i \in k}^{N} Yi \qquad \text{Equation 2}$$
$$Uk = \frac{1}{N}\sum_{i=0, i \in k}^{N} Ui$$
$$Vk = \frac{1}{N}\sum_{i=0, i \in k}^{N} Vi$$
$$xk = \frac{1}{N}\sum_{i=0, i \in k}^{N} xi$$
$$yk = \frac{1}{N}\sum_{i=0, i \in k}^{N} yi$$

Here, $\Sigma$ in Equation 2 represents the sum for all of the pixels included in the k-th segment, and N represents the total number of pixels included in the k-th segment.

Next, the control unit 2 determines whether or not the division processing is to be ended (step S207). If the division processing is to be continued (No in step S207), the processing of steps S203 to S206 is performed again, and the label image 21 is updated.

This end determination in step S207 may be a determination made by, for example, monitoring the updated state of the centroid in Equation 2. Specifically, if there is little change in the pixel location (xk,yk) and the pixel value (Yk,Uk,Vk) of the centroid between before and after the update, it is determined that the segment division processing is to be ended (Yes in step S207). Alternatively, the end determination may be made based on the number of times that steps S203 to S206 are repeated. For example, the segment division processing may be ended when the processing of steps S203 to S206 has been carried ten times.

The control unit 2 repeatedly updates the label image 21 in this way. As a result, the image 10 is divided into the segments 20 shown in FIG. 6. As the affiliated segments of the pixels are updated in step S205 as described above, the shapes of the segments also change. However, the labels given to the segments are the same. Specifically, the label of the segment denoted by reference numeral 20 in FIG. 5 is k=54, and the label of the segment denoted by reference numeral 20 in FIG. 6 is also k=54. Characteristics such as the following can be seen by looking at FIG. 6. Firstly, the boundaries of the objects included in the image 10 (the first subject 11, the second subject 12, and the third subject 13) and the boundaries of the segments 20 match each other. Secondly, the sizes of the segments 20 are substantially uniform, and each object is made up of multiple segments 20. Moreover, it can be seen that no single segment 20 spans multiple objects.

Accordingly, it can be seen that in order for the user to designate the first subject 11, the user need only designate the segments included in the first subject 11. Since there is no need to designate a region in units of pixels by carefully tracing the outline portion of the first subject 11 as in conventional technology, the region designation can be executed through an easier task.

2-3. Operations in Region Designation Processing

Figure 2:
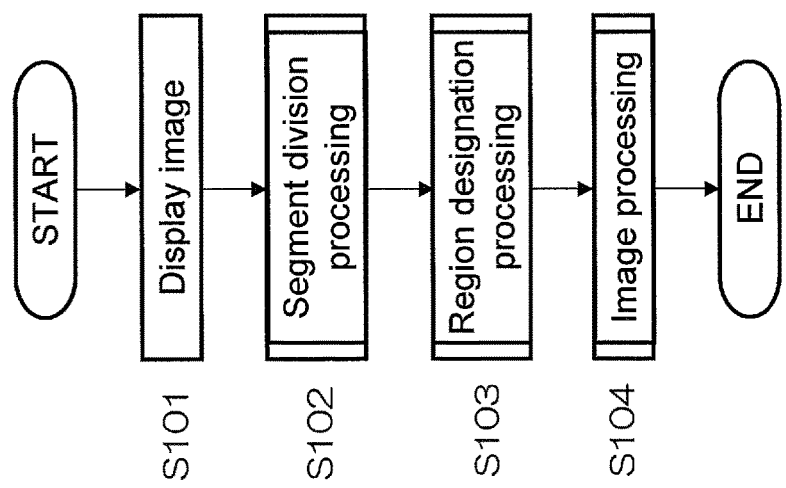
FIG. 2 is a flowchart showing operations of the image processing apparatus 1.

As shown in FIG. 2, after performing the segment division processing (step S102), the control unit 2 performs region designation processing in which predetermined processing is performed according to various user operations (referred to hereinafter as "events") (step S103).

Figure 7:
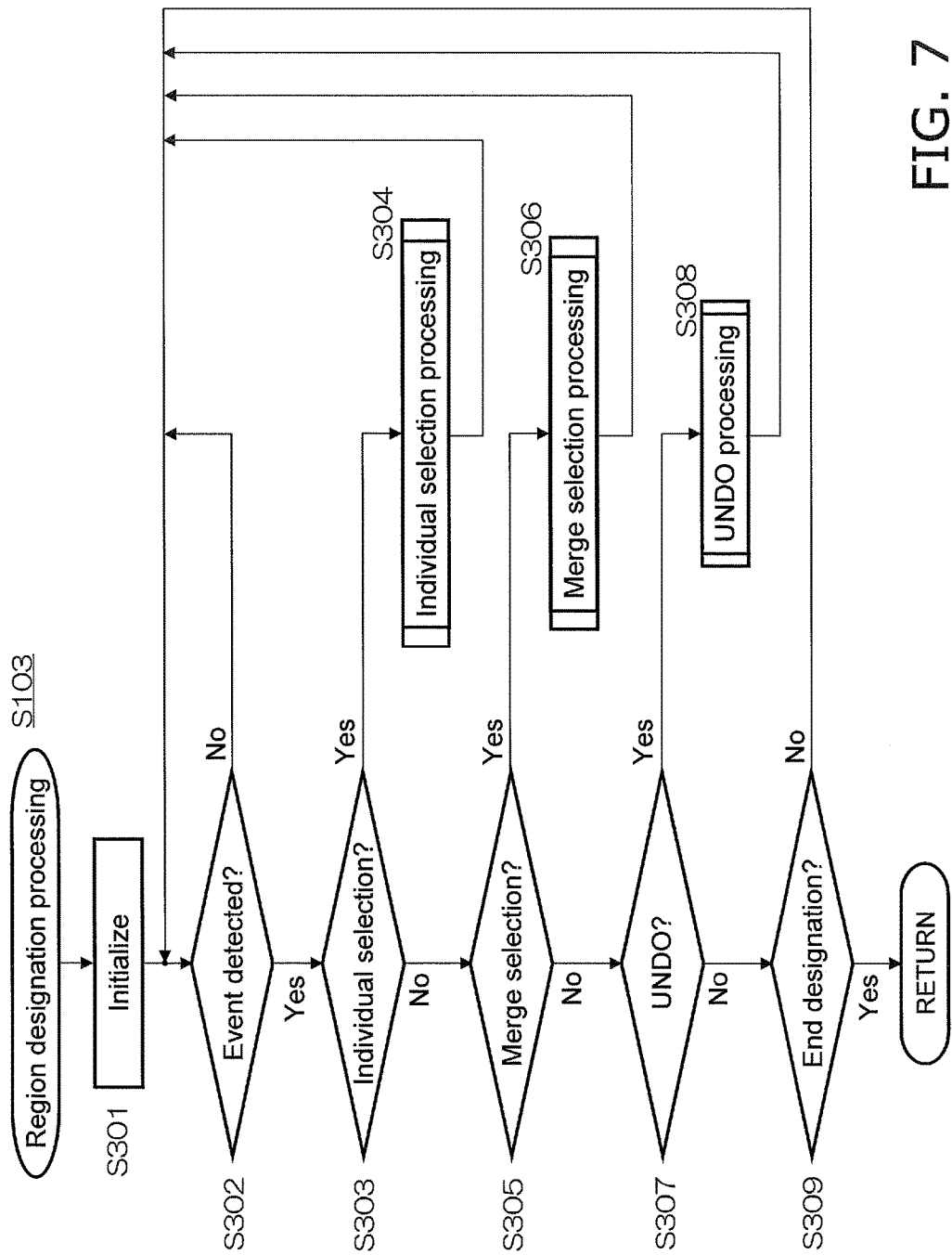
FIG. 7 is a flowchart showing operations in region designation processing performed by the image processing apparatus 1.
Figure 8:
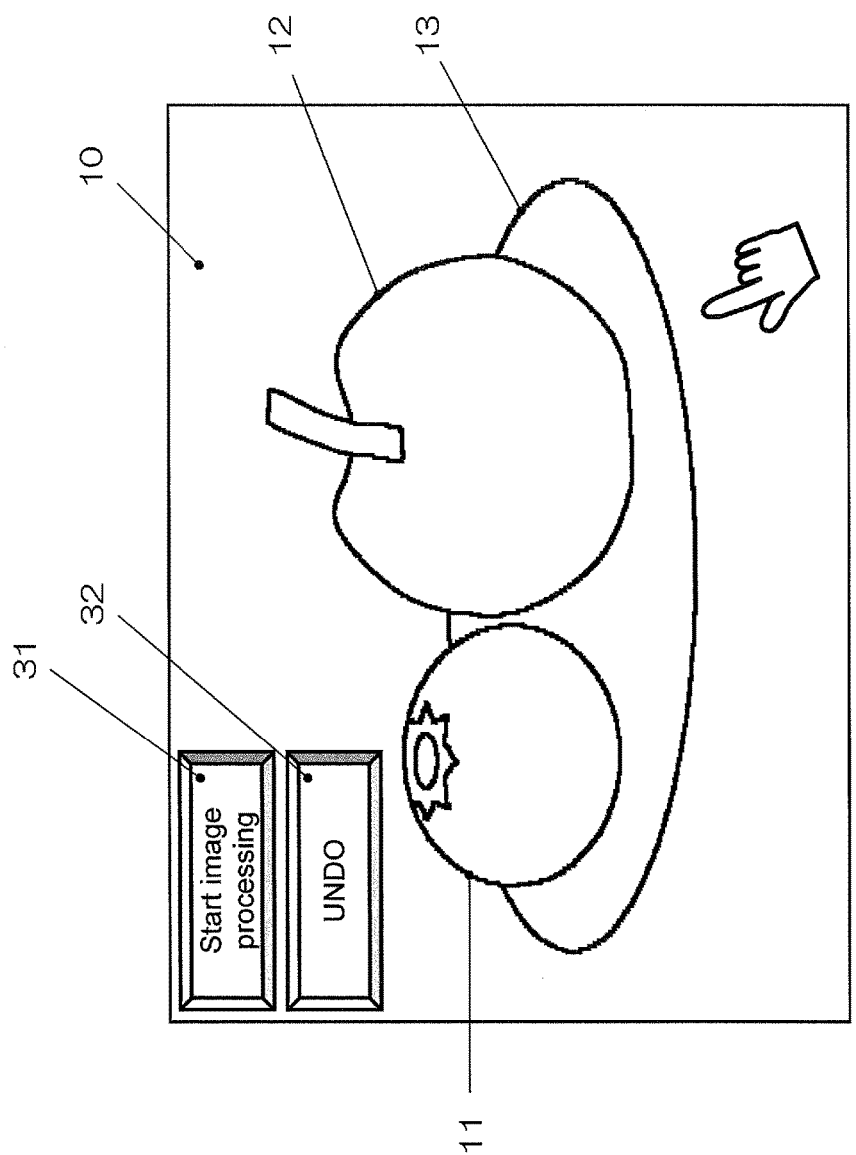
FIG. 8 is a diagram showing a display state during the region designation processing.

FIG. 7 is a flowchart showing operations in the region designation processing. Also, FIG. 8 is a diagram showing the display state during the region designation processing. In addition to the image 10, the liquid crystal monitor serving as the display unit 5 displays a start image processing button 31 and an UNDO button 32.

First, the control unit 2 performs initialization (step S301). Specifically, a history number R for managing a user operation history is set to an initial value (e.g., R=1). Also, a new label registration list L for registering the labels of segments selected by the user and the history number R is allocated in a RAM storage area of the storage unit 4.

Next, the control unit 2 repeats step S302 until an event is detected, that is to say, waits for a user operation. When some kind of operation is performed by the user, an event detected by the operation input unit 6 is generated, and the procedure moves to steps S303, S305, S307, and S309.

When the user touches the liquid crystal monitor serving as the display unit 5, that is to say, touches the screen thereof, the touch panel serving as the operation input unit 6 detects this as an event. If the user operation was a tap (an operation for touching the screen for a short period of time) or a drag (movement while touching the screen), individual selection processing (step S304) is executed. After the individual selection processing has been completed, the state of waiting for input (step S302) is entered again.

Also, if the user operation was a double tap (touching the screen for a short period of time twice), merge selection processing (step S306) is executed, and then the state of waiting for input (step S302) is entered again. Note that the input operations described above are merely examples, and the input operations are not limited in this way. Also, one input operation may be substituted with another input operation.

Also, if the user touched the UNDO button 32, UNDO processing (step S308) is executed, and then the state of waiting for input (step S302) is entered again.

If the user touched the start image processing button 31, the control unit 2 determines that the region designation processing is to be ended (Yes in step S309), and ends the region designation processing (step S103). If the start image processing button 31 has not been touched, the control unit 2 determines that the region designation is to be continued (No in step S309), and then the state of waiting for input (step S302) is entered again.

The following is a detailed description of the individual selection processing (step S304), the UNDO processing (step S308), and the merge selection processing (step S306).

2-3-1. Operations in Individual Selection Processing (Tap Operation)

Figure 9:
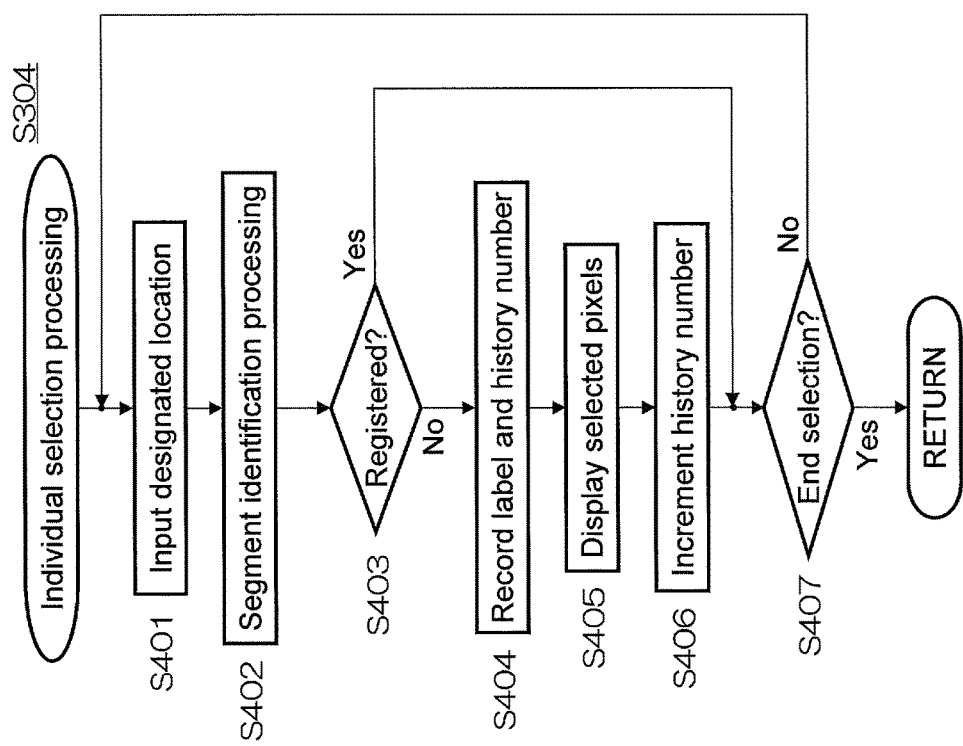
FIG. 9 is a flowchart showing operations in individual selection processing performed by the image processing apparatus 1.

FIG. 9 is a flowchart showing operations in the individual selection processing (step S304). Also, FIGS. 10A to 10C and 11A to 11C are diagrams for describing operations in the individual selection processing.

Figure 10C:
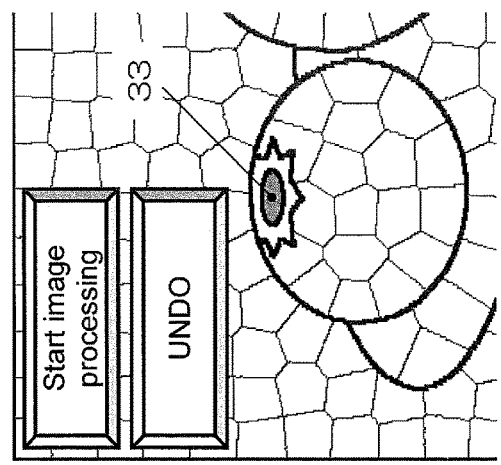
FIGS. 10A to 10C are diagrams for describing operations in the individual selection processing.
Figure 10B:
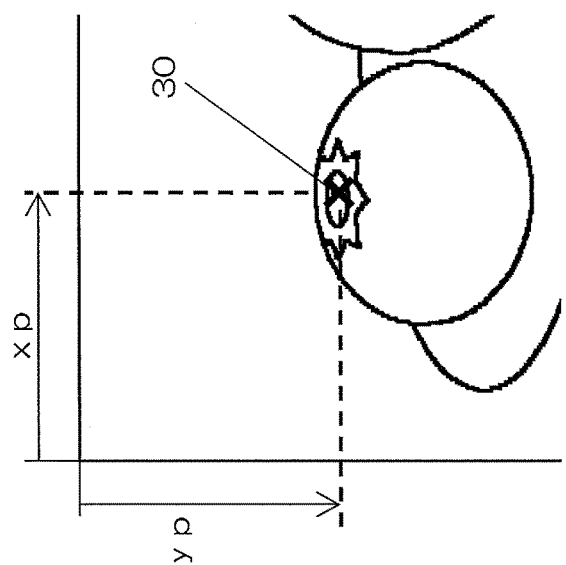
Figure 10A:
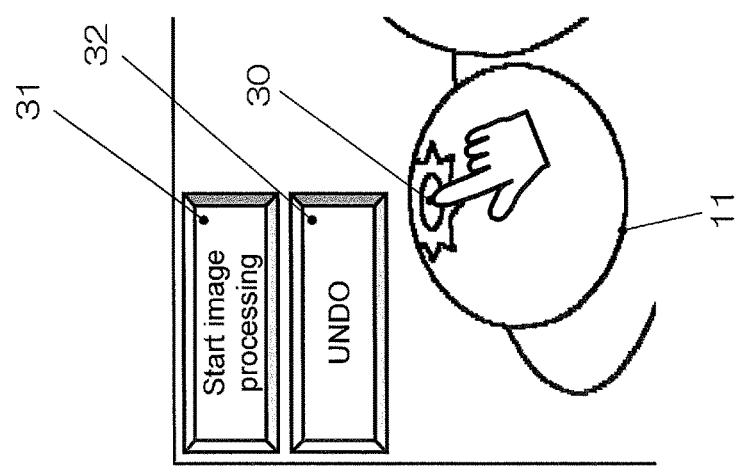

As shown in FIG. 10A, when the user touches a portion in the range of the first subject 11 displayed on the screen (this touched portion will hereinafter be referred to as a "designated location" 30), the touch panel serving as the operation input unit 6 detects this as an event, and the control unit 2 starts the individual selection processing shown in FIG. 9.

First, the control unit 2 requests the operation input unit 6 to input the pixel location (xp,yp) of the designated location 30 designated by the user. As shown in FIG. 10B, the operation input unit 6 inputs the pixel location (xp,yp), which is based on the top left of the image 10 as the origin, to the control unit 2 (step S401).

The control unit 2 then references the information of the label image 21 shown in FIG. 6, and identifies a segment 33 that includes the pixel location (xp,yp) (step S402).

The control unit 2 then determines whether or not the label of the segment 33 is registered in the label registration list L (step S403). If the label of the segment 33 is already registered (Yes in step S403), the procedure proceeds to step S407.

If the segment 33 has been designated for the first time, its label is not registered in the label registration list L, and therefore the label of the segment 33 and the history number R (R=1) are recorded as a pair (step S404). All of the pixels included in the segment 33 are then displayed as selected pixels in an emphasized manner as shown in FIG. 10C (step S405). Also, the history number R is incremented by 1 (to become R=2) (step S406).

Next, the control unit 2 inquires the operation input unit 6 regarding the state of contact with the user's finger, and determines whether or not the individual selection processing is to be ended (step S407). If the user operation was a tap (operation for touching the screen for a short period of time), the finger has already moved away from the screen. The control unit 2 therefore ends the individual selection processing (procedure moves to Yes in step S407), and returns to a state of waiting for input (step S302 in FIG. 7).

Figure 11C:
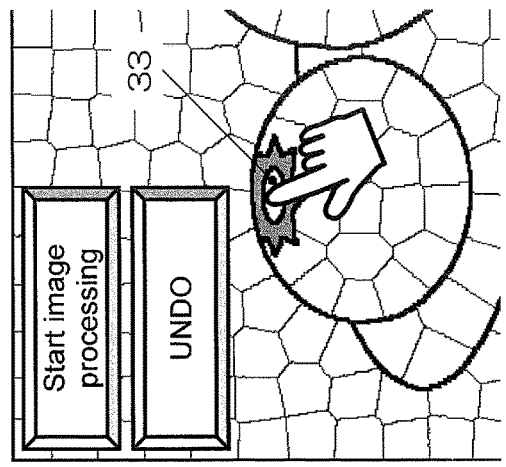
FIGS. 11A to 11C are diagrams for describing operations in the individual selection processing.
Figure 11B:
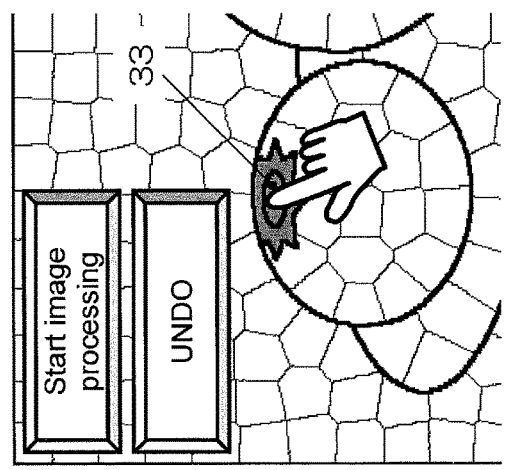
Figure 11A:
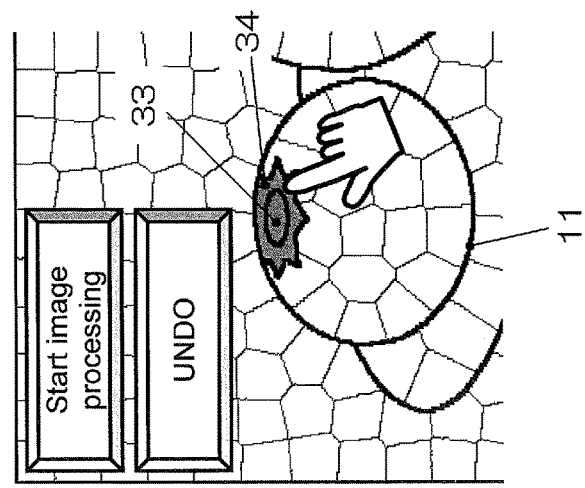

Next, if the user taps the region outside the segment 33 (step S302 in FIG. 7) as shown in FIG. 11A, the processing of steps S401 to S406 is performed in a similar manner. Accordingly, the label of a segment 34 and the history number R (R=2) are recorded as a pair in the label registration list L (step S404). All of the pixels included in the segment 34 (selected pixels) are then displayed in an emphasized manner as shown in FIG. 11A (step S405). Furthermore, the history number R is incremented by 1 (to become R=3) (step S406), and since the user operation was a tap (procedure moves to Yes in step S407), the individual selection processing is ended.

As described above, individual selection processing is executed by the control unit 2 performing segment selection processing in accordance with user operations (taps), and displaying selected segments in an emphasized manner on the display unit 5.

Note that if the user mistakenly taps a portion in the range of the segment 33 as shown in FIG. 11B, processing is executed as described below. The control unit 2 similarly performs the processing of steps S401 and S402, but in this case, it is determined that the segment 33 is already registered when referencing the label registration list L in step S403. Accordingly, the individual selection processing is ended without executing steps S404 to S406, and without changing the history number R (remains R=3).

As described above, by merely tapping portions in the range of the displayed first subject 11, the user can successively select the segments 33 and 34 included in the first subject 11. As a result, the task of designating a region such as the first subject 11 can be executed more easily. Moreover, even if the same segment is mistakenly tapped again, that operation is immediately excluded in step S403, thus having an effect of not allowing that operation to have any sort of effect on the designation result.

Note that a configuration is possible in which if the user performs a press-and-hold (a continued press without moving) on a portion in the range of the already-registered segment 33 for a certain period of time (e.g., 2 sec) or more, this is detected as a different event, and the selection of the segment 33 is canceled as shown in FIG. 11C. Alternatively, a switch or the like may be provided for switching the operation for segment selection and the operation for selection cancelation. Specifically, a configuration is possible in which if the user switches the operation to the selection cancelation operation, and then taps a portion in the range of a segment being displayed in an emphasized manner, then the registration of that segment is canceled, and the recorded content in the label registration list L is amended and updated.

2-3-2. Operations in Individual Selection Processing (Drag Operation)

Figure 12C:
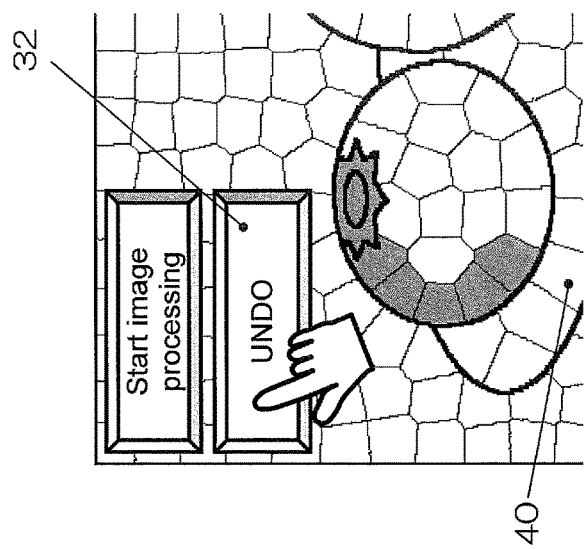
FIGS. 12A to 12C are diagrams for describing operations in the individual selection processing and UNDO processing.
Figure 12B:
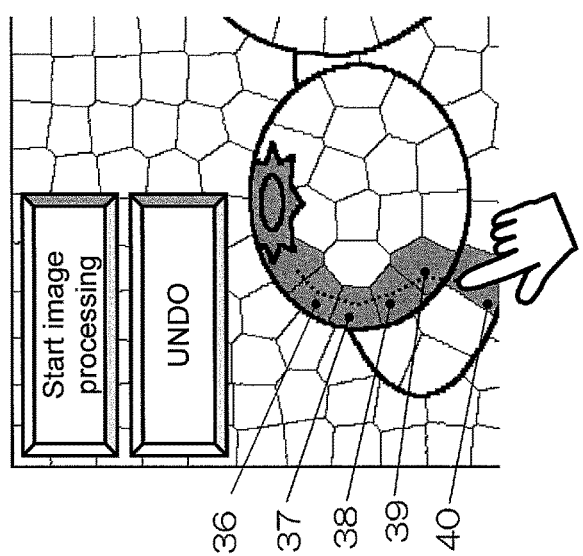
Figure 12A:
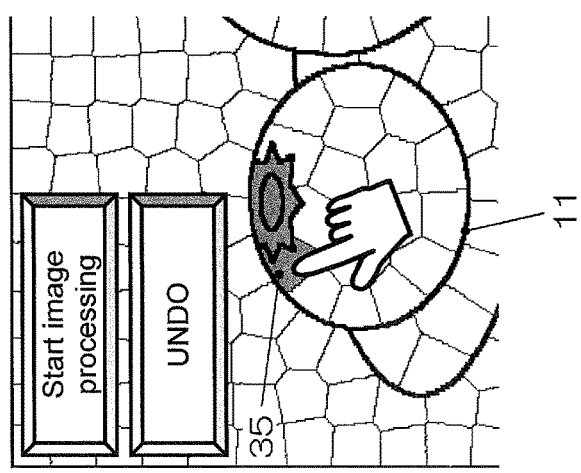

FIGS. 12A to 12C are diagrams for describing operations in the individual selection processing (when a drag operation is performed) and the UNDO processing. The following describes the case where the user starts performing a drag from a segment 35 in the first subject 11 as shown in FIG. 12A. The flowchart of operations in FIG. 9 will be referenced in this case as well.

Similarly to the case where a tap operation is performed, if a designated location is input through a user operation (step S401), the control unit 2 references the information of the label image 21 in FIG. 6 and identifies a segment 35 that includes the designated pixel location (xp,yp) (step S402). It is then determined whether or not the label of the segment 35 is registered in the label registration list L (step S403). Since the segment 35 is not registered, the label of the segment 35 and the history number R (R=3) are recorded as a pair in the label registration list L (step S404). The control unit 2 then displays all of the pixels included in the segment 35 in an emphasized manner as selected pixels on the display unit 5 as shown in FIG. 12A (step S405). The control unit 2 also increments the history number R by 1 (to become R=4) (step S406).

Next, the control unit 2 inquires the operation input unit 6 regarding the state of contact with the user's finger, and determines whether or not the individual selection processing is to be ended (step S407). Since the user operation is a drag (movement while touching the screen), contact with finger is continuing. Accordingly, the control unit 2 determines that the individual selection processing is to be continued (procedure moves to No in step S407), and executes the processing of steps S401 to S407 again.

The following describes the case where the user continues to perform a drag along the path indicated by the dotted line in FIG. 12B. Since the processing of steps S401 to S407 is repeatedly executed as described above, the labels of the segments that include the path indicated by the dotted line and the history number R are successively recorded as pairs in the label registration list L. Specifically, the control unit 2 records pairs of a label and the history number R in the label registration list L in the following order: the label of a segment 36 and the history number R (R=4), the label of a segment 37 and the history number R (R=5), the label of a segment 38 and the history number R (R=6), the label of a segment 39 and the history number R (R=7), the label of a segment 40 and the history number R (R=8). Also, in accordance with the movement of the user's finger, all of the pixels included in the registered segments 36, 37, 38, 39, and 40 (selected pixels) are successively displayed in an emphasized manner on the display unit 5. The history number R is then incremented to R=9.

As described above, by merely roughly tracing portions in the range of the first subject 11, the user can successively select the segments 35 to 39 in the range of the first subject 11, and can easily designate the region along the edge of the first subject 11. Moreover, successively updating the emphasized display of the selected pixels has an effect of making it possible for the user to perform the task of designating a region of the image on the display unit 5 while visually checking the selected pixels.

2-3-3. Operations in UNDO Processing

Assume now that the user has realized that the segment 40 has been selected after performing the drag operation as shown in FIG. 12B. The segment 40 is not a segment included in the first subject 11. In view of this, the user suspends the drag operation and separates their finger from the screen. The control unit 2 thus proceeds to Yes in step S407 and ends the individual selection processing.

Figure 13:
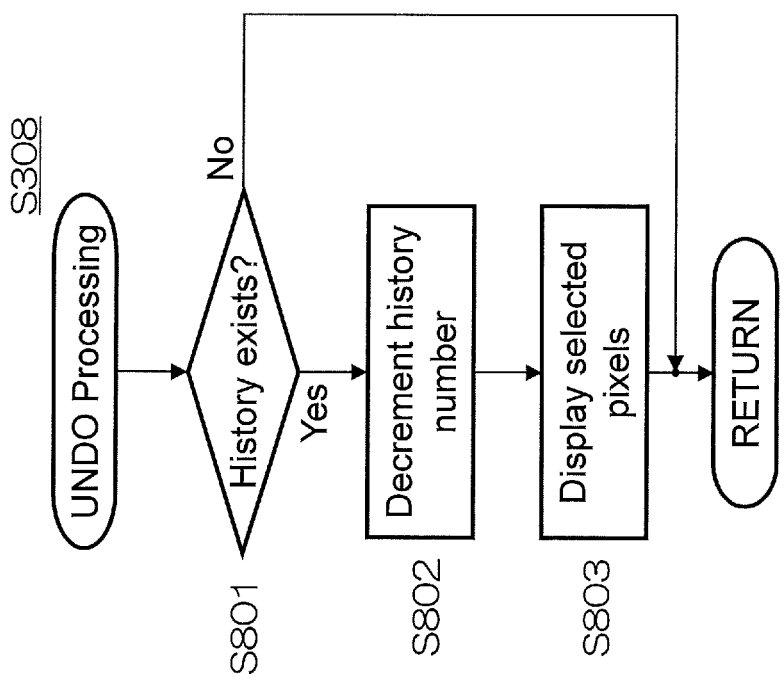
FIG. 13 is a flowchart showing operations in the UNDO processing performed by the image processing apparatus 1.

Next, the user taps the UNDO button 32 in order to cancel the selection of the segment 40 as shown in FIG. 12C. The control unit 2 thus executes the UNDO processing (step S308). FIG. 13 is a flowchart showing operations in the UNDO processing. The following describes operations in the UNDO processing.

First, the control unit 2 determines whether or not a history exists (step S801). Specifically, if the history number R in the registration list L is greater than the initial value (if R>1), it is determined that a history exists (procedure moves to Yes in step S801). If it is determined that a history does not exist, the UNDO processing is ended (procedure moves to No in step S801).

Next, the control unit 2 decrements the history number R by 1 (step S802). Since the history number is currently R=9 in the above-described example, R=8 is obtained. The control unit 2 then updates the emphasized display of selected pixels displayed on the screen (step S803). Specifically, the control unit 2 extracts all of the segments registered in the label registration list L before the current history number (R=8), that is to say, from R=1 to 7, and displays the corresponding pixels in an emphasized manner. Since the segments 33, 34, 35, 36, 37, 38, and 39 are the registered segments, the pixels included in those segments are displayed in an emphasized manner. Since the segment 40 was registered when the history number R was R=8, the control unit 2 returns the segment 40 from the emphasized display to the normal display so as to be displayed on the display unit 5 as shown in FIG. 12C.

Note that if the user taps the UNDO button one more time, the control unit 2 decrements the history number to R=7 and returns the pixels included in the segment 39 to the normal display. Each time the user then continues to tap the UNDO button, the control unit 2 returns the segments 38, 37, 36, 35, 34, and 33 to the normal display in the stated order. At this time, the history number returns to the initial value (R=1).

As described above, the user can cancel the registration of the segment that was registered immediately previously by merely tapping the UNDO button, thus making it possible to immediately make a correction if the user makes an operation error. In other words, the task of designating a region such as the first subject 11 can be made an easier task. Moreover, successively updating the emphasized display of the selected pixels has an effect of making it possible for the user to perform the designation task while visually checking the selected pixels.

Note that a REDO operation opposite to the UNDO operation can also be easily realized. Specifically, the control unit 2 need only increment the history number R by the amount that it was decremented in the UNDO operation.

2-3-4. Operations in Merge Selection Processing (Double Tap Operation)

Figure 14:
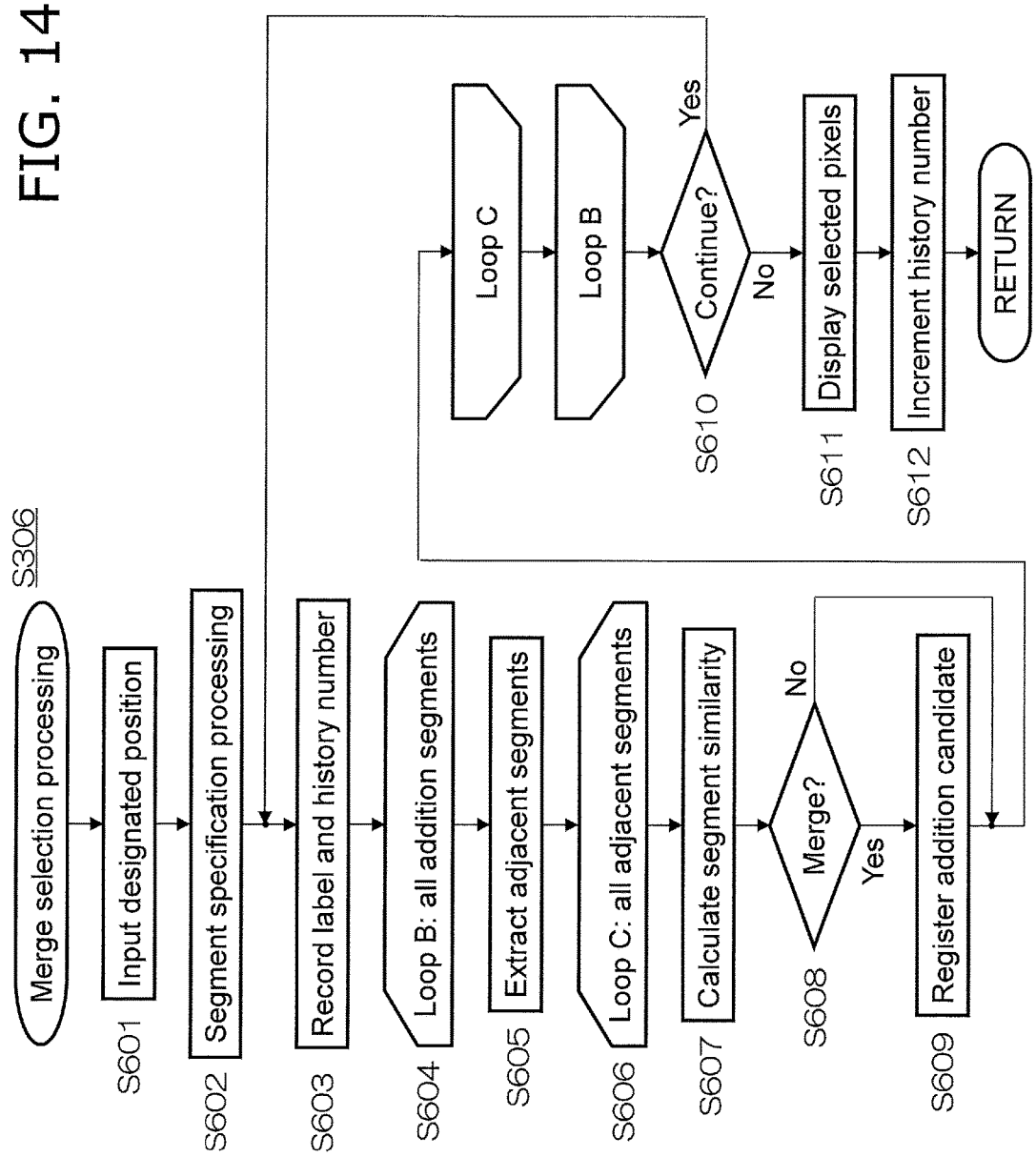
FIG. 14 is a flowchart showing operations in merge selection processing performed by the image processing apparatus 1.

FIG. 14 is a flowchart showing operations in the merge selection processing (step S306). Also, FIGS. 15A to 15C and 16A to 16C are diagrams for describing operations in the merge selection processing.

Figure 15C:
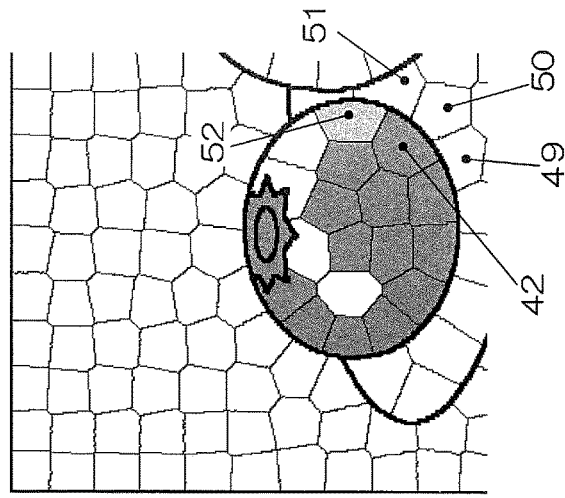
FIGS. 15A to 15C are diagrams for describing operations in the merge selection processing.
Figure 15B:
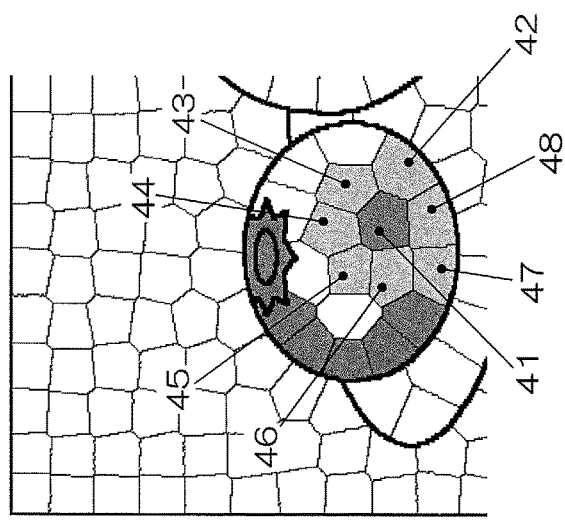
Figure 15A:
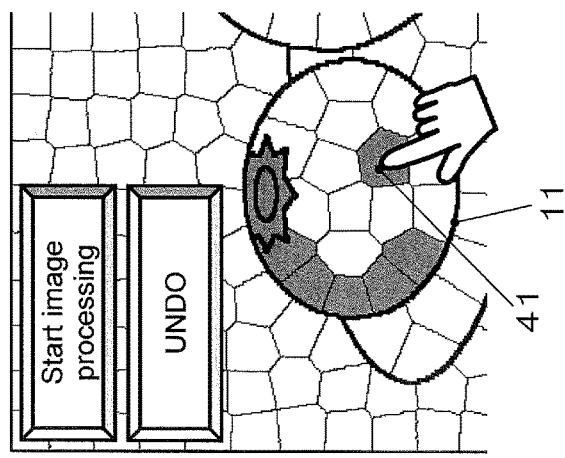

If the user double taps a portion in the range of the first subject 11 displayed on the screen as shown in FIG. 15A, the touch panel serving as the operation input unit 6 detects this as an event, and the control unit 2 starts the merge selection processing (step S306) shown in FIG. 14.

Similarly to the case of a tap for performing the individual selection processing, the operation input unit 6 inputs the pixel location (xp,yp) of the location designated by the user to the control unit 2 (step S601). The control unit 2 then references the information of the label image 21 shown in FIG. 6, and identifies a segment 41 that includes the pixel location (xp,yp). Here, the control unit 2 registers only the label of the segment 41 in an addition candidate list La (step S602). Note that the addition candidate list La is stored in a RAM storage area or the like of the storage unit 4 similarly to the label registration list L.

Next, the control unit 2 records all of the labels of the segments that were registered in the addition candidate list La in step S603 with the one history number R (R=8) as pairs in the label registration list L (step S603). When this recording in the label registration list L has been completed, the addition candidate list La is initialized.

Next, the control unit 2 performs the processing of loop B (steps S604 to S609) on all of the addition segments that were registered in the label registration list L in step S603. The content of the processing in the steps of loop B will be described below in order.

First, in step S605, the control unit 2 extracts all of the adjacent segments (one example of adjacent divided regions) for each of the addition segments that were added to the label registration list L. Note that even if a segment is an adjacent segment, it is excluded if its label is already registered in the label registration list L or in the addition candidate list La.

The control unit 2 then performs the processing of loop C on all of the adjacent segments that were extracted (step S606). The content of the processing in the steps of loop C will be described below in order.

In step S607, the control unit 2 calculates a similarity E between the addition segment and each of the adjacent segments. Specifically, in the case of the i-th addition segment having the pixel value (Yi,Ui,Vi) at the centroid that was updated in step S206 in FIG. 3, the similarity E to the j-th adjacent segment having the pixel value (Yj,Uj,Vj) at the centroid is calculated using Equation 3 below.

$$E = C1(Yi-Yj)^2 + C2(Ui-Uj)^2 + C3(Vi-Vj)^2 \quad \text{Equation 3}$$

Here, C1, C2, and C3 are weighting coefficients for the luminance Y and the color differences U and V. These coefficients need only be determined in advance experimentally or empirically.

Next, the control unit 2 compares the result of the calculation of the similarity E with a predetermined threshold value, and determines whether or not the corresponding segments are to be merged (step S608).

In the case of determining that the similarity E is less than the threshold value, that is to say, that the j-th adjacent segment is highly similar to the i-th addition segment (procedure moves to Yes in step S608), the control unit 2 registers the label number of the j-th adjacent segment in the addition candidate list La (step S609).

As described above, in the processing of loop C, the processing of steps S607 to S609 is executed on all of the adjacent segments for each of the addition segments. Also, in the processing of loop B, the processing of steps S605 to S609 is executed on all of the addition segments that were added to the label registration list L.

Next, the control unit 2 determines whether or not the merge selection processing is to be continued (step S610). This determination is made by counting the number of segments that are registered in the addition candidate list La. If any segment is registered in the addition candidate list La, the control unit 2 continues the merge processing (procedure moves to Yes in step S610), and the procedure returns to step S603.

However, if no segments are registered in the addition candidate list La after the initialization in step S603, the control unit 2 ends the merge processing (procedure moves to No in step S610).

The control unit 2 then extracts all of the segments that are registered as a pair with the current history number (R=8) in the label registration list L, and displays the corresponding pixels in an emphasized manner on the display unit 5 (step S611). Furthermore, the control unit 2 increments the history number R by 1 (to become R=9) (step S612), and ends the merge selection processing.

The following is a more detailed description of the merge selection processing with references to FIGS. 15A to 15C and FIGS. 16A to 16C.

As shown in FIG. 15A, the control unit 2 identifies the segment 41 based on the position that was double tapped by the user in the range of the first subject 11 displayed on the screen (step S601), and registers the label of the segment 41 in the addition candidate list La (step S602). The control unit 2 then records the label of the segment 41 and the history number R (R=8) as a pair in the label registration list L (step S603). The control unit 2 then initializes the addition candidate list La.

Next, the control unit 2 extracts all of the adjacent segments 42 to 48 as shown in FIG. 15B for the segment 41 that was added to the label registration list L (step S605).

The control unit 2 then calculates the similarity E between the segment 41 and each of the adjacent segments using Equation 3 (step S607), and determines whether or not the segments are to be merged (step S608). Since the adjacent segments 42 to 48 are all segments that are located in the range of the first subject 11, their similarity to the segment 41 is high. The control unit 2 therefore determines that the adjacent segments 42 to 48 are all to be merged, and registers the label numbers of these seven segments in the addition candidate list La (step S609). The procedure then moves to step S610, in which the control unit 2 determines that the addition candidate list La is not empty, and thus the procedure returns to step S603.

Next, in step S603, the seven labels of the segments 42 to 48 that were registered in the addition candidate list La and the history number R (R=8) are added to the label registration list L as pairs by the control unit 2. The control unit 2 then initializes the addition candidate list La.

Next, the control unit 2 extracts adjacent segments 49 to 52 as shown in FIG. 15C for the segment 42 that was added to the label registration list L in step S603 (step S605). Although the three segments 41, 43, and 48 are also adjacent to the segment 42 here, they are excluded from the group of adjacent segments since they are segments that are already registered in the label registration list L.

The control unit 2 then calculates the similarity E between the segment 42 and each of the adjacent segments using Equation 3 (step S607), and determines whether or not the segments are to be merged (step S608). Since the adjacent segments 49 to 51 are all segments that are located outside the range of the first subject 11, their similarity to the segment 42 is low. The control unit 2 therefore determines that the adjacent segments 49 to 51 are all not to be merged (procedure moves to No in step S608). However, the remaining segment 52 is a segment that is in the range of the first subject 11, and therefore its similarity to the segment 42 is high. The control unit 2 therefore determines that the adjacent segment 52 is to be merged (procedure moves to Yes in step S608), and registers the label number of the segment 52 in the addition candidate list La (step S609).

Figure 16C:
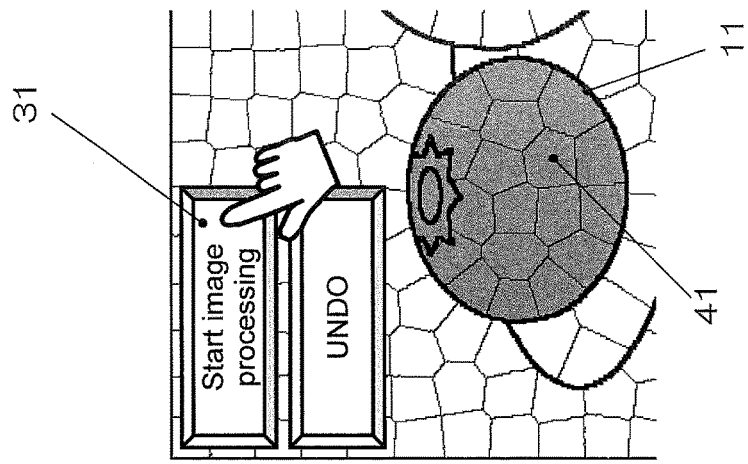
FIGS. 16A to 16C are diagrams for describing operations in the merge selection processing.
Figure 16B:
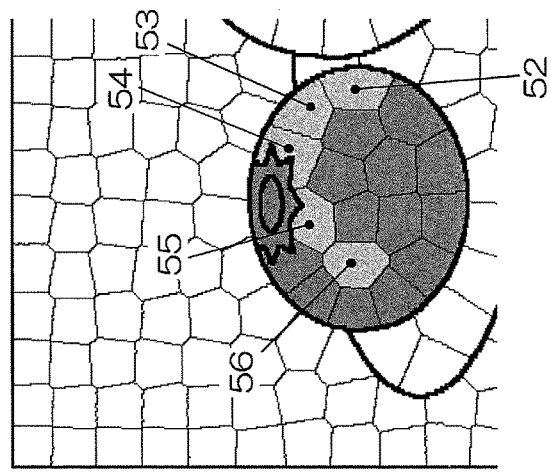
Figure 16A:
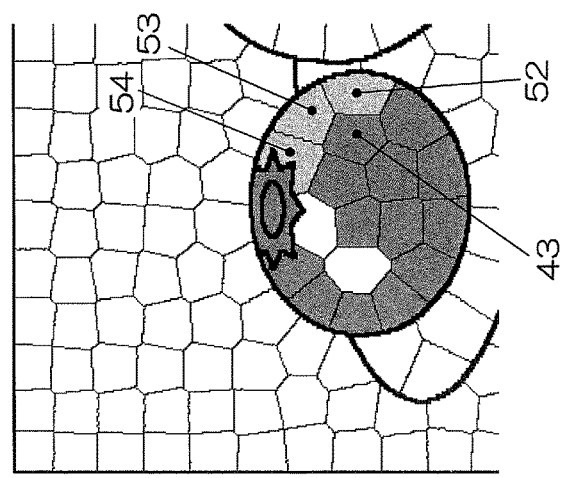

Similarly, the control unit 2 extracts adjacent segments 53 and 54 as shown in FIG. 16A for the segment 43 that was added to the label registration list L in step S603 (step S605). The control unit 2 then calculates the similarity E between the segment 43 and each of the adjacent segments using Equation 3 (step S607), and determines whether or not the segments are to be merged (step S608). Since the adjacent segments 53 and 54 are segments that are in the range of the first subject 11, their similarity to the segment 43 is high. The control unit 2 therefore determines that the adjacent segments 53 and 54 are to be merged (step S608), and registers the label numbers of the segments 53 and 54 in the addition candidate list La (step S609).

The control unit 2 then similarly repeats this processing so as to register the label numbers of segments 55 and 56 in the addition candidate list La as shown in FIG. 16B (step S609). Then, after the procedure moves to step S610, the addition candidate list La is not empty, and therefore the procedure returns to step S603.

In step S603, the five labels of the segments 52 to 56 registered in the addition candidate list La and the history number R (R=8) are added to label registration list L as pairs. The control unit 2 then initializes the addition candidate list La.

Next, the control unit 2 extracts adjacent segments for each of the segments 52 to 56 that were added to the label registration list L in step S603 (step S605), calculates the similarity E for each of the adjacent segments using Equation 3 (step S607), and determines whether or not the segments are to be merged (step S608). However, since none of the segments are located in the range of the first subject 11, the control unit 2 determines that none of the adjacent segments are to be merged. Accordingly, no segments are registered in the addition candidate list La after the initialization in step S603, and therefore it is determined that the merge selection processing ended (step S610).

The control unit 2 then extracts all of the segments 41 to 48 and 52 to 56 that are registered as a pair with the current history number (R=8) in the label registration list L, and displays the corresponding pixels in an emphasized manner as shown in FIG. 16C (step S611). Furthermore, the control unit 2 increments the history number R by 1 (to become R=9) (step S612), and ends the merge selection processing.

Note that as has been described with reference to the flowchart in FIG. 13, if the user taps the UNDO button 32, the registration of all of the segments that were immediately previously registered is canceled. Specifically, the selection of the segments 41 to 48 and 52 to 56 that were recorded as a pair with the history number R=8 is canceled. Accordingly, the user can return straight from the state shown in FIG. 16C to the state shown in FIG. 12C by operating the UNDO button 32.

Also, although the similarity to the i-th addition segment was calculated when calculating the similarity E for the adjacent segment using Equation 3, the similarity to the segment that was double tapped first (i.e., the segment 41) may be calculated. Alternatively, a configuration is possible in which in step S603, an average value is obtained for all of the added segments, and the similarity to that average value is calculated. For example, when calculating the similarity E for the adjacent segments 49 to 52 in FIG. 15C, the similarity to the average value for the segments 41 to 48 may be calculated instead of calculating the similarity to the segment 42.

As described above, by merely performing a double tap in the range of the first subject 11, the user can automatically select the segments included in the range of the first subject 11, thus making it possible to easily designate the entire region of the first subject 11. Also, the user can swiftly return to the state before the double tap by merely tapping the UNDO button. This enables the task of designating a portion of an image region such as the first subject 11 to be performed with an easier task.

3. Conclusion

As described above, the image processing apparatus 1 of the present embodiment displays an image (step S101 in FIG. 2), divides the displayed image into multiple small regions in accordance with similarity calculated based on pixel values and pixel locations (step S102 in FIG. 2), gives labels to the divided small regions (step S202 in FIG. 2), monitors the selection of the divided small regions by the user (step S302 in FIG. 7), records the labels of the selected small regions and the selection order (step S404 in FIG. 9), and explicitly indicates the selected small regions (step S405 in FIG. 9). This enables the task by which the user designates a portion of the image to be carried out more easily.

Also, the image processing apparatus 1 of the present embodiment detects cancelation processing performed by the user (step S307 in FIG. 7), and based on the recorded selection order, cancels the explicit indication of one or more small regions in reverse order beginning from the small region that was selected last (steps S802 to S803 in FIG. 13). This enables canceling the registration of segments that were immediately previously recorded, thus making it possible to immediately make a correction if the user makes an operation error.

Other Embodiments

Some or all of the processing in the above-described embodiments may be realized by computer programs. Also, some or all of the processing executed by the image processing apparatus 1 is executed by a processor such as a central processing unit (CPU) in a computer. Also, programs for executing the processing are stored in a storage device such as a hard disk or a ROM, and are executed in the ROM or read out to a RAM and then executed.

Also, the processing executed by the image processing apparatus 1 may be realized by hardware, or may be realized by software (including the case of being realized together with an OS (operating system), middleware, or a predetermined library). Furthermore, such processing may be realized by a combination of software and hardware.

The image processing apparatus 1 of the above-described embodiments may be realized as an image processing method or a computer program for causing a computer to execute image processing. Also, a computer-readable recording medium recording the program is encompassed in the present invention. Here, examples of the computer-readable recording medium include a flexible disk, a hard disk, a CD-ROM, an MO, a DVD, a DVD-ROM, a DVD-RAM, a BD (Blu-ray Disc), and a semiconductor memory.

The computer program is not limited to being recorded on the recording medium, and may be transmitted via, for example, an electrical communication line, a wireless or wired communication line, or a network typified by the Internet.

Also, the execution sequence of the image processing in the above-described embodiments is not necessarily limited to the description of the above embodiments, and the steps in the execution sequence can be interchanged without departing from the gist of the invention.

Embodiments have been described above as illustrative examples of techniques of the present invention. The accompanying drawings and detailed description have been provided for this purpose.

Accordingly, the constituent elements included in the accompanying drawings and the detailed description may include not only constituent elements that are essential to solving the problem, but also constituent elements that are not essential to solving the problem, in order to illustrate examples of the techniques. For this reason, these non-essential constituent elements should not be immediately found to be essential constituent elements based on the fact that they are included in the accompanying drawings or detailed description.

Also, the above-described embodiments are for illustrating examples of the techniques of the present invention, and therefore various modifications, substitutions, additions, omissions, and the like can be made within the scope of the claims or a scope equivalent thereto.

The present disclosure is applicable to electronic devices that have an image display function, such as digital cameras, digital video cameras, personal computers, mobile phones, and information terminals.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the image processing apparatus and image processing method. Accordingly, these terms, as utilized to describe the technology disclosed herein should be interpreted relative to the image processing apparatus and image processing method.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. An image processing apparatus that performs region designation with respect to a displayed image, the image processing apparatus comprising:
   a display device configured to display an image constituted by a predetermined number of pixels;
   an input device configured to receive a selection operation with respect to the image;
   a processor programmed to control the display device and the input device; and
   a storage device which the processor reads data from and writes data to,
   wherein the processor is further programmed to:
   generate a plurality of divided regions acquired by dividing the image in accordance with similarity calculated based on pixel values and pixel locations;
   each time a divided region among the plurality of divided regions is selected according to the selection operation received by the input device, store identification information of the selected divided region in the storage device in association with a selection order of selecting the divided region;
   display the divided region corresponding to the stored identification information on the display device in an identifiable manner;
   the input device is further configured to receive a cancellation operation for cancelling the selection of the divided region,
   the processor is programmed to:
      cancel the identification information stored in the storage device in reverse order to the selection order in accordance with the cancellation operation received by the input device; and
      discontinue displaying the divided region in the identifiable manner on the display device when cancelling the identification information corresponding to the displayed divided region.

2. The image processing apparatus according to claim 1, wherein:
   the input device is configured to receive the cancellation operation by selection of a single button displayed on the display device.

3. The image processing apparatus according to claim 1, wherein:
   the processor is programmed to acquire the plurality of divided regions by repeatedly dividing the image in accordance with the similarity calculated based on pixel values and pixel locations.

4. The image processing apparatus according to claim 1, wherein:
   the input device is configured to receive the selection operation by detecting a touch on a part of the divided region displayed on the display device by a user.

5. The image processing apparatus according to claim 1, wherein:
   when the input device receives a second selection operation for the divided region that has been selected according to a first selection and displayed on the display device in the identifiable manner, the processor cancels the first selection for the divided region.

6. An image processing apparatus that performs region designation with respect to a displayed image, the image processing apparatus comprising:
   a display device configured to display an image constituted by a predetermined number of pixels;
   an input device configured to receive a selection operation with respect to the image;

a processor programmed to control the display device and the input device; and a storage device which the processor reads data from and writes data to, wherein the processor is further programmed to:

generate a plurality of divided regions acquired by dividing the image in accordance with similarity calculated based on pixel values and pixel locations;

each time a divided region among the plurality of divided regions is selected according to the selection operation received by the input device, store identification information of the selected divided region in the storage device in association with a selection order of selecting the divided region;

display the divided region corresponding to the stored identification information on the display device in an identifiable manner; and the processor is programmed to:
identify one or more adjacent divided regions around the selected divided region;
calculate similarity between the selected divided region and the one or more adjacent divided regions;
store identification information of the one or more adjacent divided regions in the storage device when the calculated similarity is a predetermined value or greater; and
display the one or more adjacent divided regions together with the selected divided region on the display device in the identifiable manner.

7. The image processing apparatus according to claim 6, wherein:
the processor is programmed to calculate the similarity based on a difference between the pixel values.

8. The image processing apparatus according to claim 6, wherein:

the selected divided region and the one or more adjacent divided regions stored in the storage device are associated with a single piece of identification information, and the control unit is configured to display the selected divided region and the one or more adjacent divided regions on the display device at the same time in the identifiable manner.

9. An image processing method for performing region designation with respect to an image displayed on a display device, the image processing method including:

receiving a selection operation with respect to the image;

generating a plurality of divided regions by dividing the image in accordance with similarity calculated based on pixel values and pixel locations, the image being constituted by a predetermined number of pixels;

each time a divided region among the plurality of divided regions is selected according to a selection operation by a user, storing identification information of the selected divided region in a memory in association with a selection order of selecting the divided region;

displaying the divided region corresponding to the stored identification information on the display device in an identifiable manner;

receiving a cancellation operation for cancelling the selection of the divided region;

canceling the identification information stored in the storage device in reverse order to the selection order in accordance with the cancellation operation received by the input device; and discontinuing the displaying of the divided region in the identifiable manner on the display device when cancelling the identification information corresponding to the displayed divided region.

* * * * *